United States Patent
Le Grand et al.

(10) Patent No.: US 10,240,995 B2
(45) Date of Patent: Mar. 26, 2019

(54) CONSTRUCTION OF A SURFACE OF BEST GPS VISIBILITY FROM PASSIVE TRACES USING SLAM FOR HORIZONTAL LOCALIZATION AND GPS READINGS AND BAROMETER READINGS FOR ELEVATION ESTIMATION

(71) Applicant: Google LLC, Mountain View, CA (US)

(72) Inventors: Etienne Le Grand, Mountain View, CA (US); Mohammed Khider, Mountain View, CA (US)

(73) Assignee: Google LLC, Mountain View, CA (US)

( * ) Notice: Subject to any disclaimer, the term of this patent is extended or adjusted under 35 U.S.C. 154(b) by 761 days.

(21) Appl. No.: 14/694,240

(22) Filed: Apr. 23, 2015

(65) Prior Publication Data

US 2016/0033266 A1 Feb. 4, 2016

Related U.S. Application Data

(60) Provisional application No. 62/032,519, filed on Aug. 1, 2014.

(51) Int. Cl.
*G01S 5/02* (2010.01)
*G01L 19/00* (2006.01)
(Continued)

(52) U.S. Cl.
CPC ........ *G01L 19/0092* (2013.01); *G01S 5/0263* (2013.01); *G01S 19/01* (2013.01); *G01S 19/48* (2013.01)

(58) Field of Classification Search
CPC .................................................. G01L 19/0092
See application file for complete search history.

(56) References Cited

U.S. PATENT DOCUMENTS 6,947,734 B1 9/2005 Toubassi
7,844,415 B1 11/2010 Bryant et al.
(Continued)

FOREIGN PATENT DOCUMENTS

WO WO1995022041 8/1995
WO WO2012106075 8/2012
(Continued)

OTHER PUBLICATIONS

Chen, et al., "Outlier-Detection-Based Indoor Localization System for Wireless Sensor Networks", Hindawi Publishing Corporation, International Journal of Navigation and Observation, http://www.hindawi.com/journals/ijno/2012/961785, 2012, vol. 2012, Article ID 961785, 11 pages.
(Continued)

*Primary Examiner* — Manuel L Barbee
*Assistant Examiner* — Raymond L Nimox
(74) *Attorney, Agent, or Firm* — McDonnell Boehnen Hulbert & Berghoff LLP

(57) ABSTRACT

A system includes one or more processors, and data storage configured to store instructions that, when executed by the one or more processors, cause the system to perform functions. In one example, the functions include receiving logs of data, wherein respective data in the received logs of data are collected by one or more sensors of a device over one or more locations and over a time period. In the present example, the functions also include determining location estimates of the device by performing a simultaneous localization and mapping (SLAM) optimization of the location estimates using barometer data and GPS elevational data available in the logs of data, wherein the location estimates indicate elevational locations of the device over the time period.

20 Claims, 6 Drawing Sheets

(51) Int. Cl.
*G01S 19/01* (2010.01)
*G01S 19/48* (2010.01)

(56) References Cited

U.S. PATENT DOCUMENTS

| | | | |
|---|---|---|---|
| 8,320,939 B1* | 11/2012 | Vincent | G01S 19/48 |
| | | | 370/338 |
| 8,509,761 B2 | 8/2013 | Krinsky et al. | |
| 8,521,429 B2 | 8/2013 | Sundararajan et al. | |
| 9,357,520 B2 | 5/2016 | Le Grand et al. | |
| 9,674,661 B2* | 6/2017 | Chu | H04W 4/023 |
| 2004/0127252 A1 | 7/2004 | Tsunomoto | |
| 2006/0095349 A1 | 5/2006 | Morgan | |
| 2008/0033645 A1* | 2/2008 | Levinson | G01C 15/00 |
| | | | 701/469 |
| 2011/0028122 A1 | 2/2011 | Kota et al. | |
| 2011/0250926 A1 | 10/2011 | Wietfeldt | |
| 2012/0290636 A1* | 11/2012 | Kadous | G01S 1/72 |
| | | | 709/203 |
| 2013/0102324 A1* | 4/2013 | Qiu | H04W 4/023 |
| | | | 455/456.1 |
| 2013/0138246 A1 | 5/2013 | Gutmann et al. | |
| 2013/0225202 A1 | 8/2013 | Shim et al. | |
| 2013/0238236 A1* | 9/2013 | Thrun | G01C 21/206 |
| | | | 701/418 |
| 2013/0257657 A1 | 10/2013 | Garin | |
| 2013/0317944 A1 | 11/2013 | Huang et al. | |
| 2014/0031980 A1 | 1/2014 | Gutmann et al. | |
| 2014/0114567 A1* | 4/2014 | Buchanan | G01C 21/005 |
| | | | 701/454 |
| 2014/0372072 A1 | 12/2014 | Guo et al. | |
| 2015/0133148 A1* | 5/2015 | Yang | G06F 17/30289 |
| | | | 455/456.1 |
| 2015/0223189 A1 | 8/2015 | Le Grand et al. | |
| 2015/0226577 A1 | 8/2015 | Le Grand et al. | |
| 2015/0281910 A1* | 10/2015 | Choudhury | G01S 5/021 |
| | | | 455/456.1 |
| 2015/0308839 A1 | 10/2015 | Jiang et al. | |
| 2016/0025498 A1 | 1/2016 | Le Grand | |
| 2016/0033265 A1 | 2/2016 | Le Grand et al. | |

FOREIGN PATENT DOCUMENTS

| | | |
|---|---|---|
| WO | WO2013037034 | 3/2013 |
| WO | WO2013071190 | 5/2013 |

OTHER PUBLICATIONS

Chen, et al., "Outlier-Detection-Based Indoor Localization System for Wireless Sensor Networks", http://www.hindawi.com/journals/ijno/2012/961785 (2012).

* cited by examiner

CONSTRUCTION OF A SURFACE OF BEST GPS VISIBILITY FROM PASSIVE TRACES USING SLAM FOR HORIZONTAL LOCALIZATION AND GPS READINGS AND BAROMETER READINGS FOR ELEVATION ESTIMATION

CROSS REFERENCE TO RELATED PATENT APPLICATION

The present application claims priority to U.S. provisional patent application No. 62/032,519 filed on Aug. 1, 2014, the entire contents of which are herein incorporated by reference.

BACKGROUND

A location of a computing device can be estimated based on Global Positioning System (GPS) signals. For example, a mobile computing device may receive GPS signals and responsively estimate the device location on the face of the Earth (e.g. an absolute location expressed by latitude and longitude values). Generally, there are various factors that influence the accuracy of estimated locations based on GPS signals. These factors may include the number of usable GPS signals from different GPS satellites or sources, the positions of GPS satellites or sources, atmospheric conditions that affect GPS signals, physical barriers (such as mountains, manmade structures, trees, and the like) that may interfere with GPS signals, movement of the computing device while GPS signals are being received and/or while the device is estimating the location, among other factors.

In addition using GPS signals to estimate a latitudinal and longitudinal location of a device, GPS signals can also be used to provide elevation or altitude estimates. However, such elevation estimates may have a horizontal or vertical error of within about plus or minus fifteen meters (plus or minus about fifty feet). Thus, elevation estimates using GPS signals may not be sufficiently accurate to provide useful or reliable information for some applications of the computing device. For instance, elevation estimates using GPS signals may not be sufficiently accurate to provide a reliable estimate of which floor the computing device is located within a multi-story building.

Generally, it is desirable to improve on the arrangements of conventional methods and systems or at least to provide one or more useful alternatives to help to make localization of a computing device more efficient, reliable, and/or accurate.

SUMMARY

In one example, a system includes one or more processors, and data storage configured to store instructions that, when executed by the one or more processors, cause the system to perform functions. In this example, the functions include receiving logs of data, wherein respective data in the received logs of data are collected by one or more sensors of a device over one or more locations and over a time period. Further, in the present example, the functions also include determining location estimates of the device by performing a simultaneous localization and mapping (SLAM) optimization of the location estimates using barometer data and GPS elevational data available in the logs of data, wherein the location estimates indicate elevational locations of the device over the time period.

In still another example, a computer-implemented method includes receiving logs of data, wherein respective data in the received logs of data are collected by one or more sensors of a device over one or more locations and over a time period. In this example, the method also includes determining location estimates of the device by performing a simultaneous localization and mapping (SLAM) optimization of the location estimates using barometer data and GPS elevational data available in the logs of data, wherein the location estimates indicate elevational locations of the device over the time period.

In another example, a computer readable memory having stored therein instructions, that when executed by a computing device, cause the computing device to perform functions is provided. The functions comprise receiving logs of data, wherein respective data in the received logs of data are collected by one or more sensors of a device over one or more locations and over a time period. In this example, the functions also comprise determining location estimates of the device by performing a simultaneous localization and mapping (SLAM) optimization of the location estimates using barometer data and GPS elevational data available in the logs of data, wherein the location estimates indicate elevational locations of the device over the time period.

In yet another example, a system includes means for receiving logs of data, and respective data in the received logs of data are collected by one or more sensors of a device over one or more locations and over a time period. Further, in the present example, the system also includes means for determining location estimates of the device by performing a simultaneous localization and mapping (SLAM) optimization of the location estimates using barometer data and GPS elevational data available in the logs of data, and the location estimates indicate elevational locations of the device over the time period.

These as well as other aspects, advantages, and alternatives, will become apparent to those of ordinary skill in the art by reading the following detailed description, with reference where appropriate to the accompanying figures.

DETAILED DESCRIPTION

Figure 1:
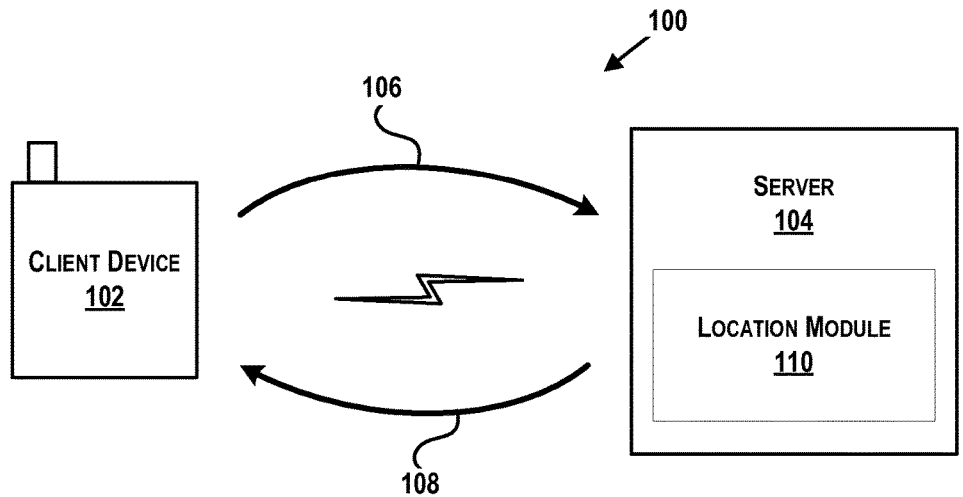
FIG. 1 illustrates an example communication system in which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting.

It may be readily understood that certain aspects of the disclosed systems and methods can be arranged and combined in a wide variety of different configurations, all of which are contemplated herein.

I. Overview

In various instances, a computing device, such as a cellular phone, may perform computations to determine a location of the device. The device location may include latitude, longitude, and elevation information or values. The present disclosure is directed, in various examples, to computing accurate device elevation values, and to constructing maps using the device elevation values.

GraphSLAM is a simultaneous localization and mapping (SLAM) algorithm. It is a state estimation algorithm. In one example, the state (localization of data traces and characteristics of maps) is determined by maximizing its likelihood. The likelihood comes from a set of constraints that are indicated by data within logs or traces of data received from one or more devices. Generally, a data trace is characterized by a collection of sensor events or output measurements from one or more sensors (e.g., GPS sensors, accelerometers, gyroscopes, magnetometers, other internal measurement units (IMUs), barometers, and WiFi signal strength sensors) that represent characteristics of the device over time, and the sensor events and measurements may also correlate to movement of the device. In an embodiment of the present disclosure, the sensor events and measurements are used as constraints in the GraphSLAM algorithm to estimate the device state, which as described generally above may include a localization (including an elevation value) of the device and characteristics of maps of a location of the device.

In an example, the computing device uses GraphSLAM to construct a surface of best GPS visibility by localizing the device horizontally (e.g., by using GraphSLAM to estimate latitude and longitude locations or values using data available in the logs of data as constraints). And for determined horizontal locations of the device, the device can use GraphSLAM to estimate the elevation by using GPS elevational readings and barometer readings as constraints for the algorithm. Generally, GPS elevational readings can provide a fair estimate of the absolute elevation, but can also be noisy readings that can produce inaccurate elevation estimates. Barometer readings generally provide locally consistent readings that provide useful information regarding changes in elevation (such as, a change in elevation between a ground floor and a higher floor of a building), but Barometer readings may produce unreliable absolute elevation estimates.

In an example, the GPS elevational readings can be used as noisy absolute constraints, and the barometer readings can be used as relative constraints for GraphSLAM. In this manner, the device can optimize the GraphSLAM algorithm by linking the GPS elevational readings and the barometer readings to provide a good estimate of the actual elevation. The resulting elevation estimates over a plurality of different horizontal localizations can be used to construct a surface and to estimate elevational changes of the surface.

In another example, the computing device determines a set of the logs of data that have an amount of GPS positioning data that is greater than a predetermined threshold. This set of the logs of data is associated with good GPS visibility, and the computing device may use the GPS elevational readings and barometer readings associated with this set of the logs of data as constraints in GraphSLAM to more accurately estimate the elevation of the device at the determined horizontal locations of the device.

The device or some other computing device (such as, a server) can use the elevation information for various purposes, such as to build an elevation map of an area or building, to estimate terrain, to estimate the number of floors in a building and the separation between the floors, to estimate floor absolute elevation, to estimate a calibration of one or more barometers used to collect the data traces, to estimate a pressure at sea level when the data traces were collected, to estimate a floor of a building that the device was on during different sections of the data traces, and to build a WiFi fingerprint for different floors of the building that can later be used in other location computations.

II. Example Systems and Devices

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, a tablet computing device, and the like, that is configured to transmit data 106 to and/or receive data 108 from the server 104 in accordance with the method and functions described herein. The client device 102 may include a user interface, a communication interface, a processor, and data storage comprising instructions executable by the processor for carrying out one or more functions relating to the data sent to and/or received by the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to and/or receive data 106 from the client device 102. The server 104 may include a location module 110 which may be configured to process the data 106 received from the client device 102 to determine locations (present and/or historical locations) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

In addition, the data 108 sent to the client device 102 from the server 104 may take various forms. For example, the server 104 may send to the client device 102 an indication of location, updated location history information, or information based on the locations of the device.

Figure 2:
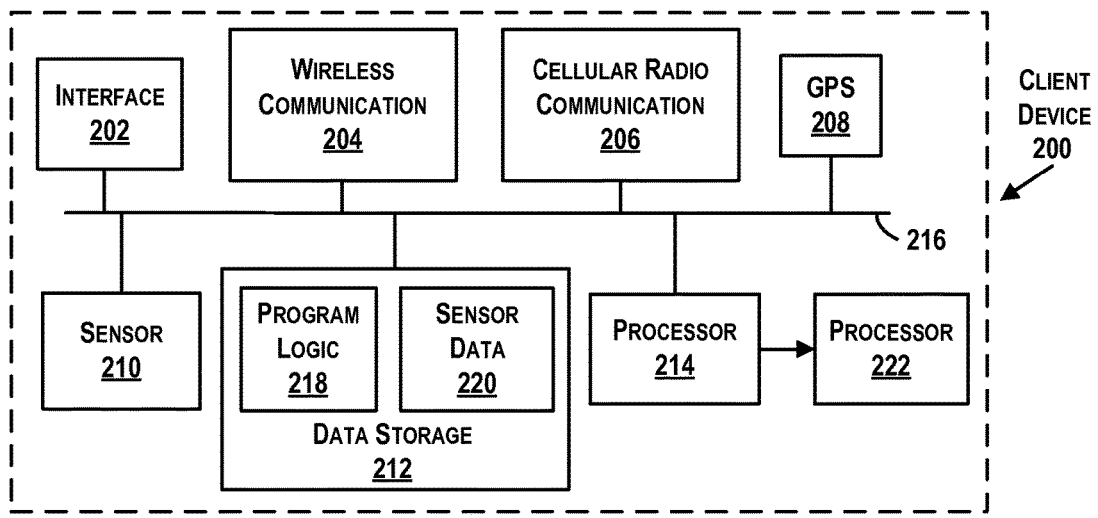
FIG. 2 illustrates a schematic drawing of an example device.

FIG. 2 illustrates a schematic drawing of an example computing or client device 200. In some examples, one or more components illustrated in FIG. 2 may be distributed across multiple computing devices. However, for the sake of example, the components are shown and described as part of one example client device 200. The client device 200 may be or may include a mobile device, desktop computer, email/messaging device, tablet computer, or similar device that may be configured to perform the functions described herein.

In some implementations, the client device 200 may include a device platform, which may be configured as a multi-layered Linux platform. The device platform may include different applications and an application framework, as well as various kernels, libraries, and runtime entities. In other examples, other formats or systems may operate the client device 200 as well.

The client device 200 may include one or more interface(s) 202, wireless communication component(s) 204, cellular radio communication component(s) 206, a global position system (GPS) 208, sensor(s) 210, data storage 212, and/or processor(s) 214. Components illustrated in FIG. 2 may be communicatively coupled together by a communication link or bus 216. The client device 200 may also include hardware to enable communication within the client device 200 and between the client device 200 and another computing device, such as a server entity. The hardware may include transmitters, receivers, and antennas, for example.

In one example, the interface 202 is configured to allow the client device 200 to communicate with another computing device, such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a WiFi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The sensor 210 may include one or more sensors, or may represent one or more sensors included within the client device 200. Example sensors include an accelerometer, gyroscope, pedometer, barometer, light sensors, microphone, camera, or other location and/or context-aware sensors.

The processor 214 may be configured to determine one or more geographical location estimates of the client device 200 using one or more location-determination components, such as the wireless communication component 204, the cellular radio communication component 206, the GPS 208, and/or the sensors 210. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. As such, the wireless communication component may also be considered one of the sensors 210. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signals from a cellular network. The cellular radio communication component 206 may also be configured to measure a round trip time (RTT) to a base station providing the signal, and to combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In a further instance, the processor 214 may use sensor data from the one or more sensors 210 to determine a location of the client device 200. For instance, the sensors 210 may include a barometer that can be used to generate barometric pressure data that corresponds to an elevation and/or relative changes in elevation of the client device. Other sensors, such as an accelerometer and a gyroscope, can also generate data that the processor 214 can use to determine a location and/or a change in relative location of the client device.

In some examples, the processor 214 may use a location-determination algorithm that combines location estimates determined by multiple location-determination components, such as a combination of the wireless communication component 204, the cellular radio component 206, the GPS 208, and the sensors 210.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 may include wired and/or wireless connections. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a graphics processing unit (GPU)). Example methods and processes described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
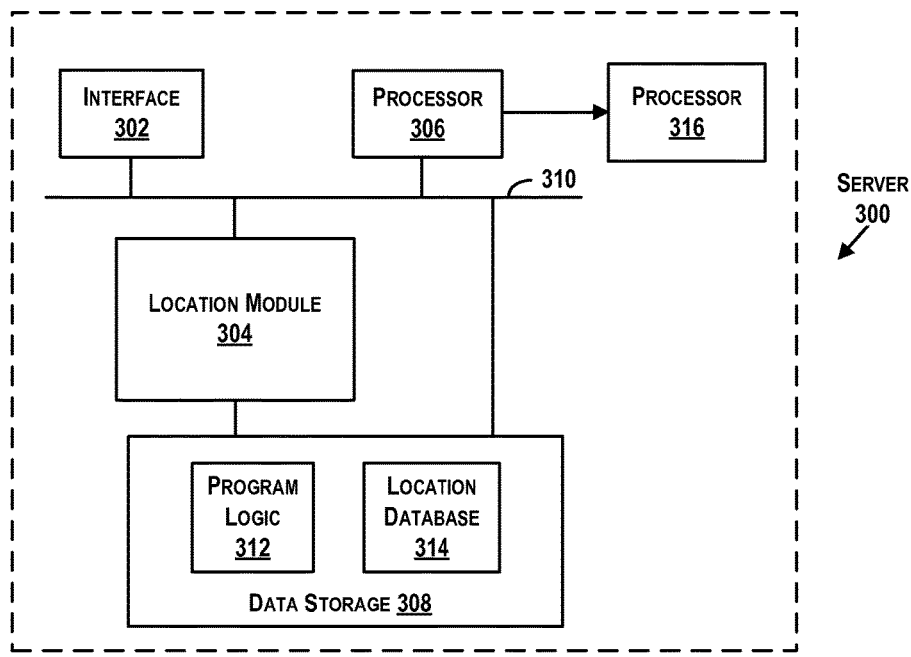
FIG. 3 illustrates a schematic drawing of another example computing device.

FIG. 3 illustrates a schematic drawing of another example computing device or server 300. In some examples, one or more components illustrated in FIG. 3 may be distributed across multiple servers. However, for the sake of example, the components are shown and described as part of one example server 300. The server 300 may represent a computing device, cloud, or similar entity that may be configured to perform the functions described herein.

The server 300 may include communication interface(s) 302, location module(s) 304, processor(s) 306, and data storage 308. The components illustrated in FIG. 3 may be coupled together by a communication link or bus 310 (e.g., wired and/or wireless links). The server 300 may also include hardware to enable communication within the server 300 and between the server 300 and another computing device (such as the device 200 of FIG. 2). The hardware may include transmitters, receivers, and antennas, for example.

In one embodiment, the communication interface 302 may allow the server 300 to communicate with another device, such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and to determine a geographic location of the client device. The determination of the location may be based on outputs of an accelerometer, gyroscope, barometer, or other sensors of the client device, as well as based on location determinations of the client device. The location module 304 may further be configured to determine and store a history of sensor measurements of the client device for later processing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316, which may be an application specific processor for input/output functionality. In other examples, functions of the processor 306 and the processor 316 may be combined into one component.

Within examples, measurements collected from various sensors of a device (such as WiFi components, GPS sensors, barometers, and inertial sensors) can be combined with information from external databases (such as known locations of WiFi access points or building floor plans) to estimate a location or movement of the device in real-time. Recording the real-time location estimate at all times (or intervals/increments of time) may also produce a location history.

III. Example Methods and Functionality

Figure 4:
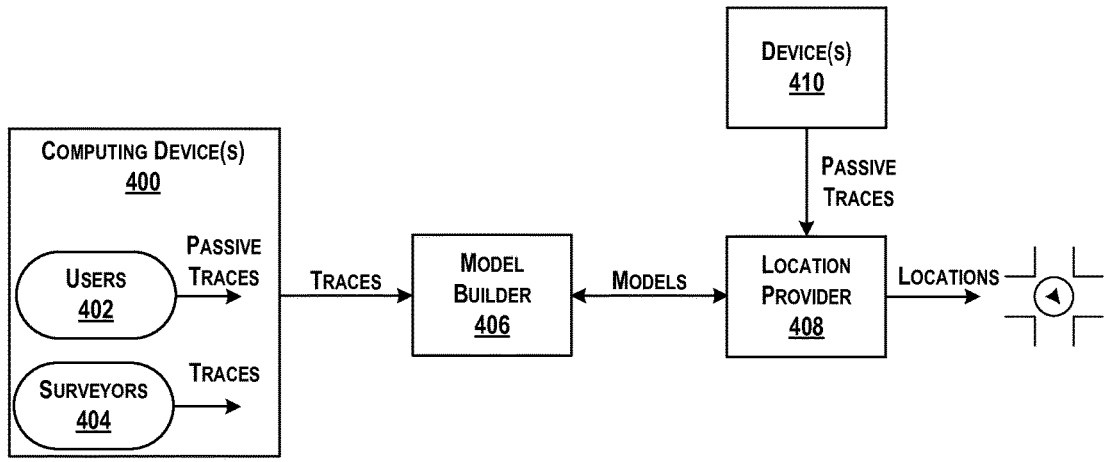
FIG. 4 is a flow diagram illustrating an example method for determining a location or movement of a device.

FIG. 4 is a flow diagram illustrating an example method for determining a location or movement of a device. Initially, computing device(s) 400, operated by users 402 or surveyors 404, may traverse areas in an environment and output traces to a model builder 406. A device operated by a user 402 may output traces passively (e.g., the device may be configured to output the trace data with no additional user input), including raw data output by sensors of the device like WiFi scans, GPS data, accelerometer data, barometer readings, etc. Each trace may be associated with a time the data was collected, and thus, for traces that include GPS data, other data in the traces also have location-specific references. A device operated by a surveyor 404 may have location-specific references for all traces, whether due to associated GPS data or manual input of location information.

The model builder 406 may be a module of a computing device or server, and may be configured to generate a model of the environment based on the received traces. The model builder 406 may include a trace localizer and a map builder. The model builder 406 may access reference data such as information like strength of signal (RSSI) for WiFi access points in the environment at specific locations in the environment, or other landmark data of the environment. The model builder 406 may be configured to generate a map or path of the device based on the traces. In one example, the model builder 406 may utilize GPS data to determine locations of the device over time, utilize dead reckoning (based on accelerometer and gyroscope outputs) to project a path, utilize elevational data (such as based on GPS elevational data and barometer readings), and optimize the path by jointly combining each. The model builder 406 may further optimize the path to match WiFi scan data to the reference WiFi maps to align a path that most likely resembles a path that the device traversed through the environment.

A location provider 408 may access a model output by the model builder 406 to determine locations of other device(s) 410 based on received traces as well. Within examples, the location provider 408 may return a location of the device or an estimation of movement of the device to the device 410 based on data in the received traces.

Traces received from devices may include a variety of measurements from multiple different sensors, and may include a variety of measurements collected over time or at various locations. A trace may refer to a sensor log or a collection of data output from sensors on the device over some time period and collected over a number of locations. The sensors that output data may be selected, or data to be included within the sensor log may also be selected. In some examples, a trace of data may include all data collected by a device (using a number of sensors) over a given time frame (e.g., about 5 seconds, or perhaps about 5 minutes long or any ranges therein or longer). Measurements in a trace or from trace to trace may be considered statistically independent. However, in instances in which the measurements are collected from positions/locations in close proximity or collected close in time, the measurements may have correlations.

The traces or logs of data may be used to build a WiFi signal strength map of the number of locations aligned to latitude and longitude or position coordinates. Estimate WiFi access point positions can be made based on known locations of where the WiFi scans occurred. The reverse is also true. To solve the problem when both of a location of a WiFi access point and locations of WiFi scans are initially unknown, a simultaneous localization and mapping (SLAM) can be performed to solve for both variables at the same time using received data in the logs of data. If one of a location of a WiFi access point or locations of WiFi scans are known, then the known data can be held constant while optimizing the other. The received logs of data can be used to determine relative paths traversed by the devices using dead reckoning, which provides estimates of access point locations and trajectory of the devices relative to each other, and such relative estimates can be aligned with more absolute positions using measurements from GPS, for example. However, GPS generally provides accurate latitude and longitude measurements, but only in certain locations (such as mostly outdoor locations).

Thus, within examples, trustworthy measurements in an absolute frame can be accessed first to generate a first estimate of a WiFi signal strength map, and new measurements and new sensor logs can be introduced to refine the estimate using the first estimate as a starting point to build upon. As each new piece of data is introduced, a current estimate is held constant and used to determine an initial estimate for the new data. Then, a SLAM optimization may be performed to jointly optimize all data without keeping any data constant. Iterations may be performed until all data has been considered.

In other examples, these processes can be performed to generate and optimize an elevational map of an area using elevational data and horizontal data.

Figure 5:
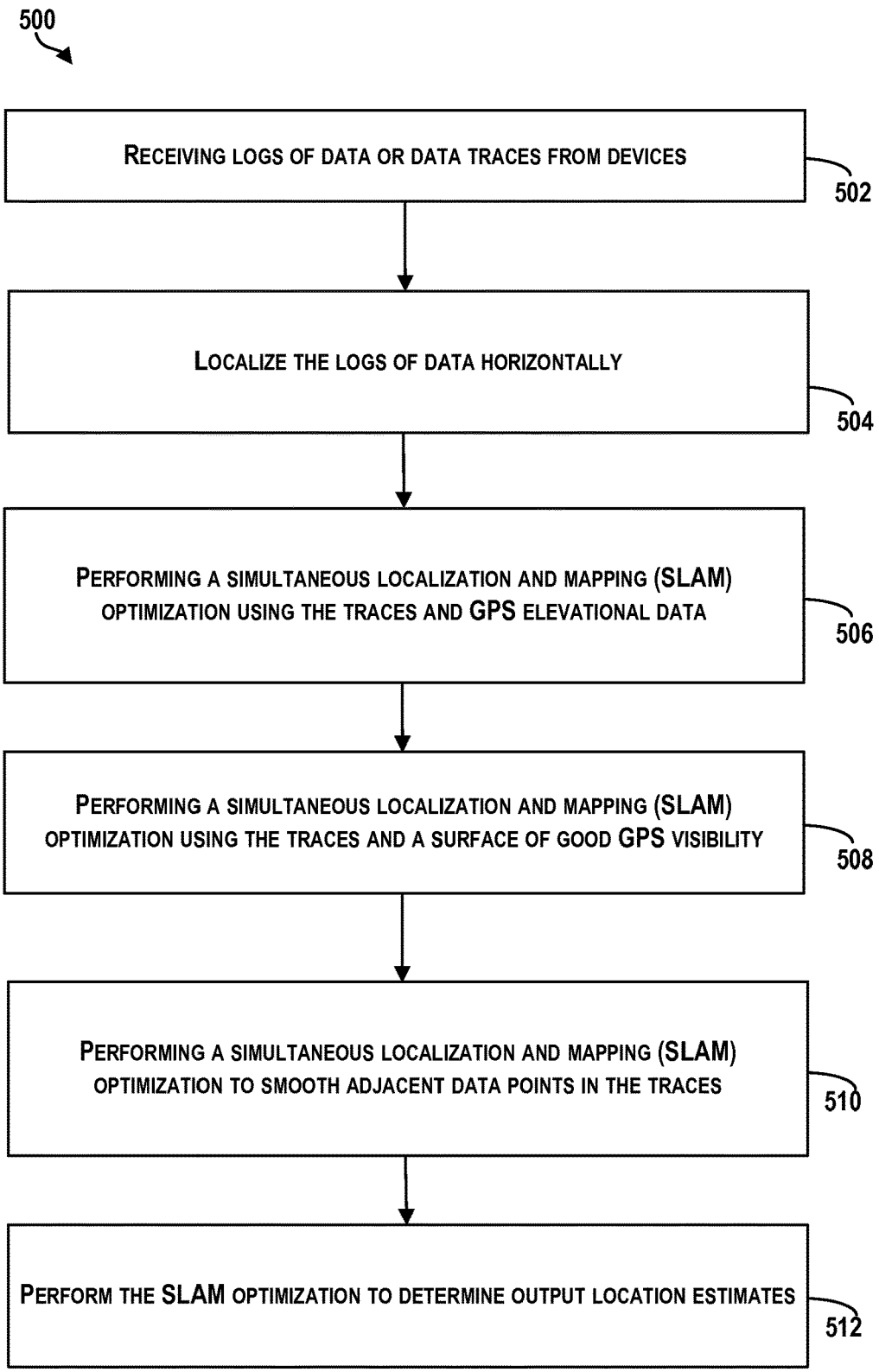
FIG. 5 is a block diagram of an example method of determining elevational location estimates of a device.

FIG. 5 is a block diagram of an example method that includes determining elevational location estimates of a device, in accordance with at least some embodiments described herein. Method 500 shown in FIG. 5 presents an embodiment of a method that, for example, could be used with the system 100 in FIG. 1, the device 200 in FIG. 2, the server 300 in FIG. 3, or the method in FIG. 4, for example, or may be performed by a combination of any components or processes of FIGS. 1-4. Method 500 may include one or more operations, functions, or actions as illustrated by one or more of blocks 502-514. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-transitory storage systems. The computer readable medium may be considered a computer readable storage medium, a tangible storage device, or other article of manufacture, for example.

In addition, for the method 500 and other processes and methods disclosed herein, each block in FIG. 5 may represent circuitry that is wired to perform the specific logical functions in the process.

Functions of the method 500 may be fully performed by a computing device (or components of a computing device such as one or more processors), or may be distributed across multiple computing devices and/or a server. In some examples, the computing device may receive information from sensors of the computing device, or where the computing device is a server the information can be received from another device that collects the information.

At block 502, a computing device, such as one or more of the client devices and/or servers discussed herein, receives logs of data or data traces from one or more devices or components of the device(s). For instance, a client device may receive data traces from, or that are otherwise based on, the output of one or more sensors of the client device and/or of other client devices. In another example, a server may receive data traces from, or that are otherwise based on, the output from sensors of one or more client devices.

The data traces may include data collected by sensors of devices over a plurality of locations and over a plurality of time periods. A respective data trace may include data corresponding generally to an elevation or vertical location, such as atmospheric pressure data from a barometer and GPS positioning data (e.g., elevational (ele) or altitude (alt) data). A respective data trace may also include data corresponding generally to a horizontal location, such as GPS positioning data (e.g., longitudinal (lng) and latitudinal (lat) data), received signal strength indication (RSSI) for wireless access points, accelerometer data, and gyroscope data. The data traces may be received on a continual basis, or periodically as the logs are collected, such as every 5 seconds, a new log of data having data collected over the 5 second time period may be received. A data trace may also be associated with a timestamp, which allows a computing device or server to correlate different data traces collected by different sensors and/or by different devices.

Further, the data traces may include different combinations of data, or data associated with different timestamps (e.g., at time t=2.0 s, GPS output lat=23.56789, lng=67.23456, ele=80.5 m; at time t=2.5 s, four Wifi access points observed at recorded RSSI strengths; at time t=3.0 s, an elevational change of 3.1 m was recorded by a barometer; at time t=3.5, GPS output lat=23.56790, lng=67.23459, and an elevational change of 0.12 m we recorded by the barometer; etc.). In these example data traces, the relative elevational changes may be based on changes in barometric pressure data, and the GPS data may be represented as absolute latitude, longitude, and elevational data. In other examples, the data in the data traces may be represented in other forms (e.g., raw data forms) that may need to be processed or converted for use by the computing device or server.

Figure 6A:
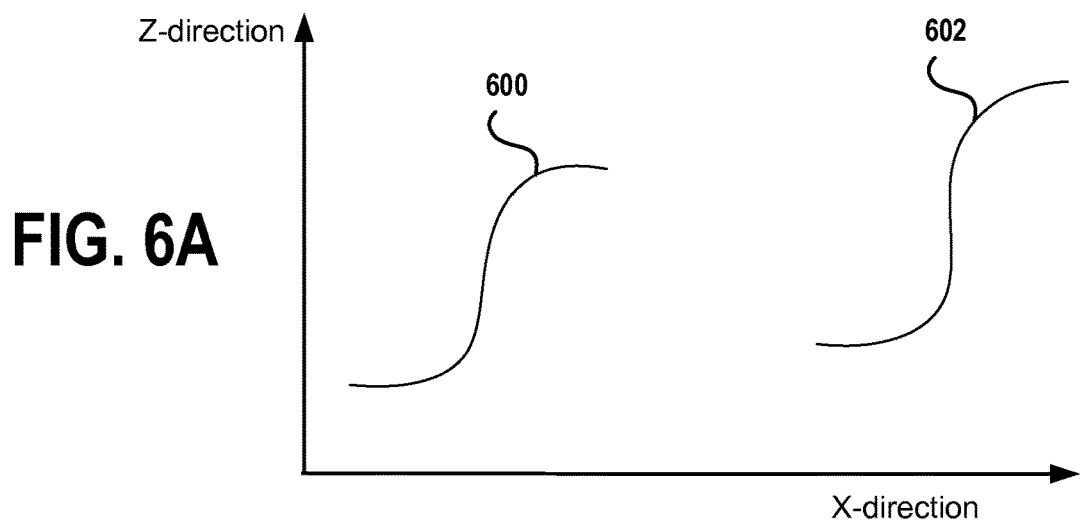
FIGS. 6A-6E illustrate example elevational localization based on barometer data and GPS elevational data from a device.

Referring to the illustrative example of FIG. 6A, at block 502, a computing device or server receives first and second data traces 600, 602, respectively. As shown in FIG. 6A, each data trace is represented by a line that has elevation location values in a Z-direction, and horizontal location values in an X-direction (e.g., latitude values). In one example, the elevation location values of the data traces are determined by barometric pressure data received from a device, and the horizontal location values of the data traces are determined by GPS data received from the device. Generally, the data traces will also include horizontal location values in a Y-direction (e.g., longitude values), and the processes described herein are applicable to localize a device in the X-direction, the Y-direction, and the Z-direction to determine locations (e.g., latitude, longitude, and elevation values), and to build maps of a three-dimensional area. Further, the data traces 600, 602 in FIG. 6A are represented by smooth curved lines for illustrative purposes. The data in the data traces may actually be discrete, periodic data points, and the smooth curved lines may represent a best fit curve of the data.

Figure 6B:
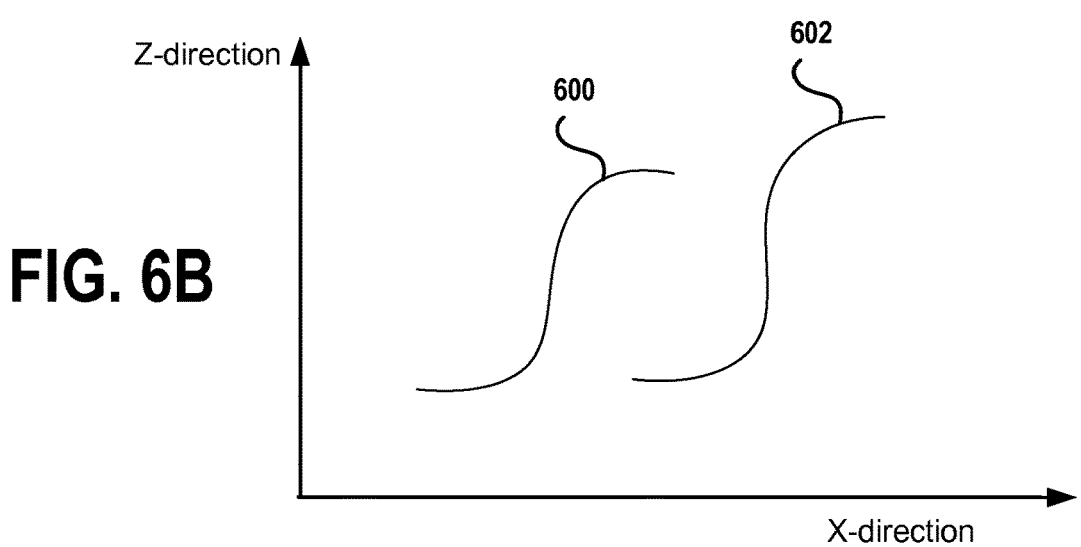

At block 504, the computing device localizes the received data traces horizontally to maximize the likelihood of the horizontal position of each data trace. This horizontal localization is shown conceptually in FIG. 6B. In one example, the computing device may perform the horizontal localization using GraphSLAM with the horizontal location values of the data traces being used as constraints. In one example, the computing device selects the data traces 600, 602 from a group of data traces based on GPS signal strengths associated with the data traces 600, 602. Generally, the computing device selects data traces for further processing that are associated with GPS signal strengths and/or GPS data that is greater than a predetermined threshold.

Figure 6C:
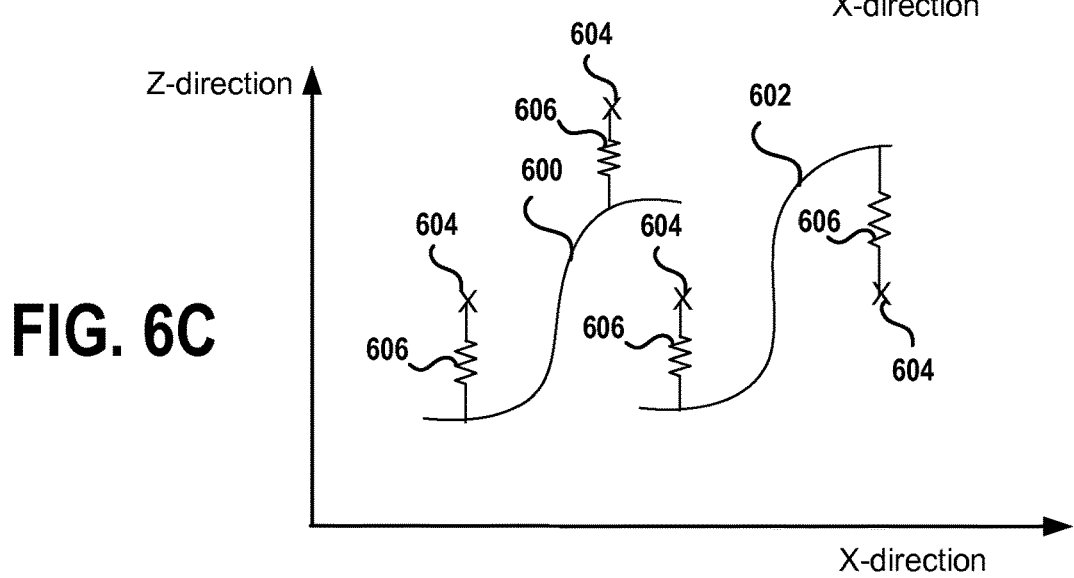
Figure 6D:
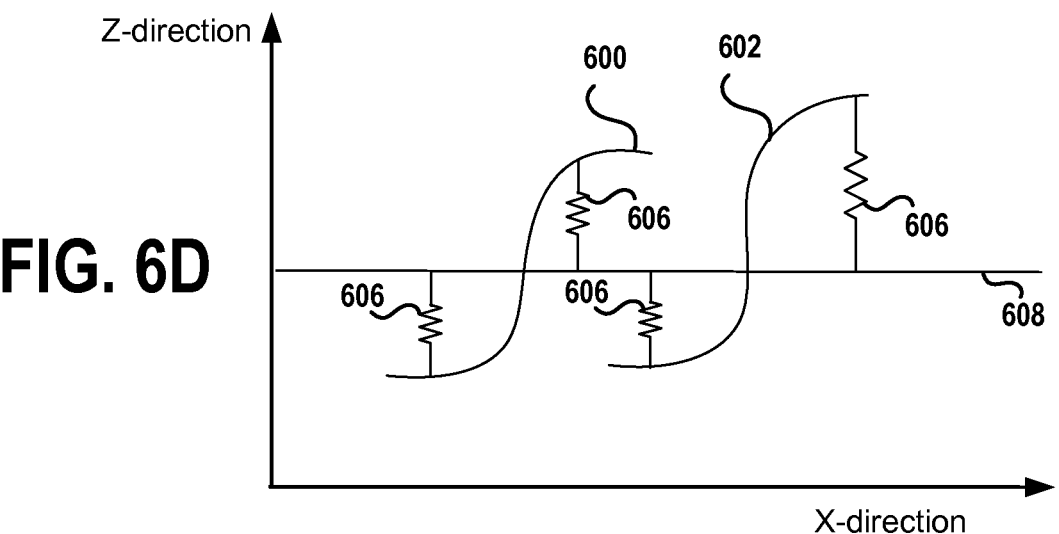

At block, 506, the computing device processes the data traces 600, 602 by using GPS elevational data associated with the data traces as an additional constraint, and performing a GraphSLAM optimization using with the GPS elevational data. FIG. 6C conceptually illustrates the linking of the GPS elevational data constraints by coupling GPS elevational data 604 with associated points of the data traces 600, 602 by springs 606.

At block 508, the computing device further processes the data traces 600, 602 by linking the traces to a surface of good GPS visibility, and performing a GraphSLAM optimization using the surface of good GPS visibility as an additional constraint. In one example, before block 508 or concurrently at block 508, the computing device analyzes GPS elevational data from a plurality of data traces, which in practice may include the data traces 600, 602, but may also include a larger group of data traces. In this example, the computing device analyzes the GPS elevational data to define the lowest associated elevation surface. The computing device may then define this lowest associated elevation surface as the surface of good GPS visibility corresponding to a ground level surface. FIG. 6 conceptually illustrates the linking of the traces 600, 602 to a surface of good GPS visibility 608 by springs 606. In one example, each data point in the traces 600, 602 may be linked to the surface 608.

At block 510, the computing device performs a smoothing operation on the data traces. In one example, the computing device performs a GraphSLAM optimization by applying a smoothing constraint that limits the elevational change between adjacent points on a data trace or adjacent data traces. Generally, the smoothing constraint specifies that elevation location values at adjacent horizontal locations are likely the same.

Figure 6E:
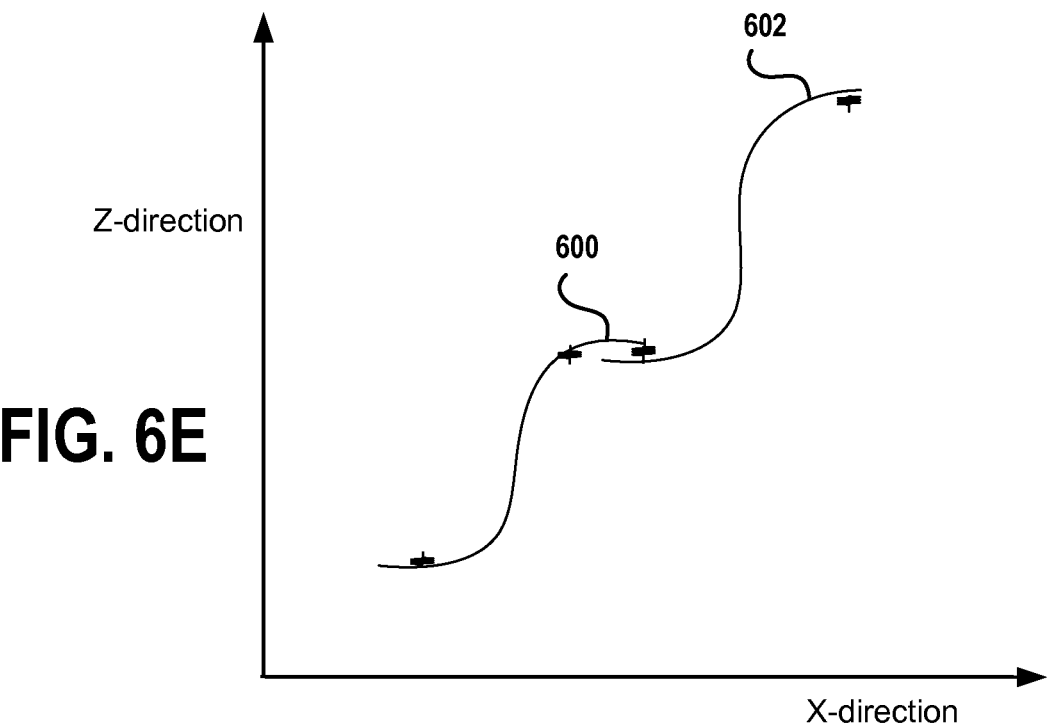

At block 512, the computing device performs a GraphSLAM optimization to determine output location estimates that include elevational and horizontal locations of the data traces 600, 602. FIG. 6E illustrates an example result from the smoothing operating and the location optimization at blocks 510, 512, respectively. The processes of blocks 502-512 may be iteratively performed as additional data traces and constraints are received, and also to perform location optimization in the Y-direction. Accordingly, the blocks 502-512 may be performed to determine locations (horizontal and elevational locations) of a device of time, and to generate a map of the area or building in which the device has traveled. The computing device may also use the elevation information to estimate terrain of the area, to estimate the number of floors in a building and the separation between the floors, to estimate floor absolute elevation, to estimate a calibration of one or more barometers used to collect the data traces, to estimate a pressure at sea level when the data traces were collected, to estimate a floor of a building that the device was on during different sections of the data traces, and to build a WiFi fingerprint for different floors of the building that can later be used in other location computations.

Figure 7:
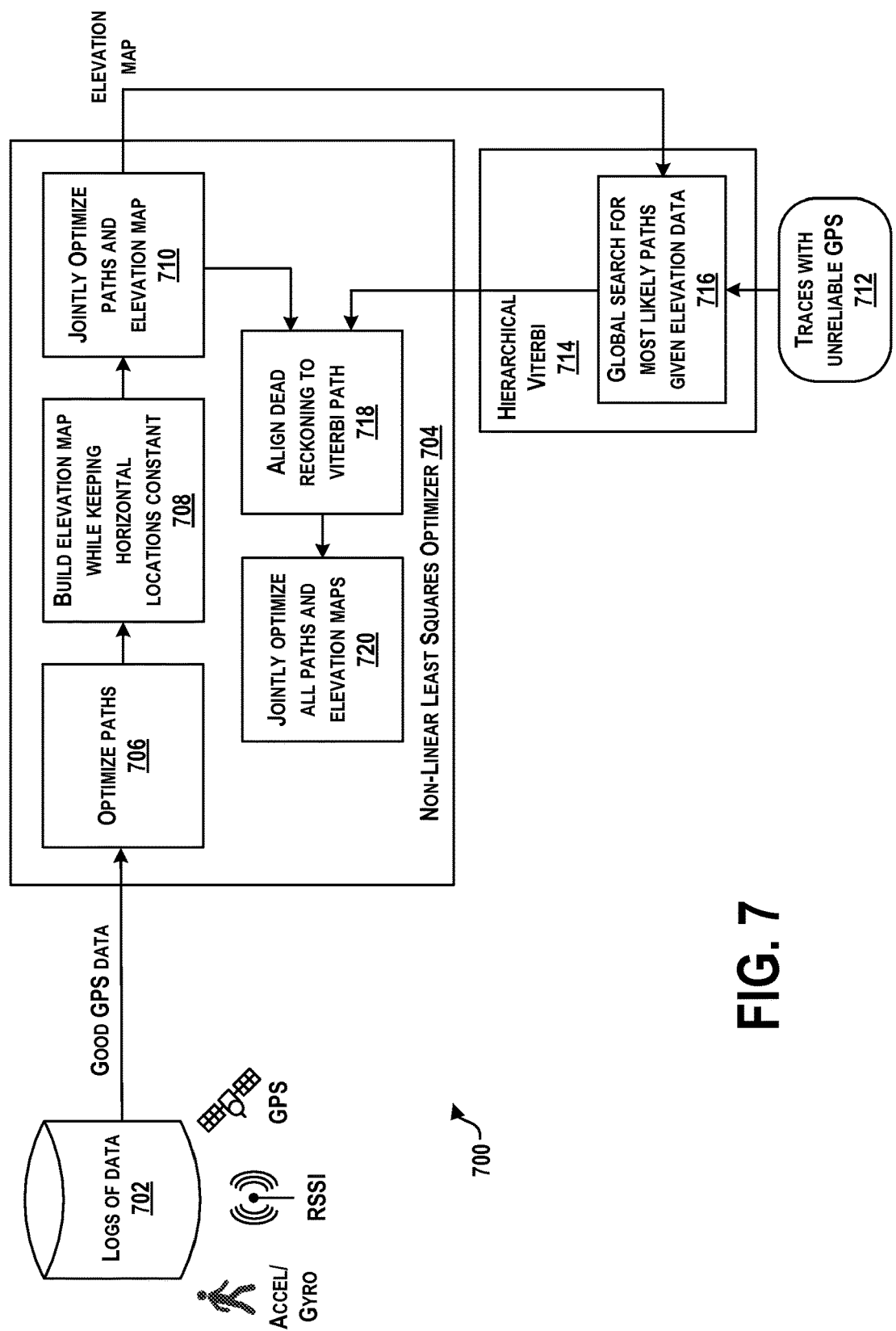
FIG. 7 is a block diagram that conceptually illustrates an example system for determining elevational location estimates.

FIG. 7 is a block diagram that conceptually illustrates an example system 700 for determining locations. Any of the blocks in the system 700 may be modules, processors, or other devices, or may take the form of instructions executable by processors to perform the associated function. In the system 700, logs of data 702 are received from one or more devices. The logs of data may include GPS, barometer, accelerometer, and gyroscope data with associated timestamps as collected by respective devices. The logs of data or traces for which there is good GPS data (e.g., logs of data that have an amount of GPS positioning data that is greater than a predetermined threshold) may be provided to a non-linear least squares optimizer 704, for example. Logs of data for which there is not good GPS data may be rejected as erroneous data or data with too much noise. The non-linear least squares optimizer 704 may optimize paths traveled by a device using GPS, barometer data, and/or dead reckoning, as shown at block 706 and as described above using, for example, a ceres optimizer, and then build optimal elevation maps while keeping horizontal locations associated with traces constant, as shown at block 708. The non-linear least squares optimizer 704 may further jointly optimize paths and elevation maps using a SLAM or GraphSLAM optimization and output an updated elevation map, as shown at block 710.

Traces with unreliable GPS data or GPS data less than the predetermined threshold (at block 712) may be received at a hierarchical Viterbi processor 714 to perform a global search for most likely paths given associated elevation data in the traces, as shown at block 716. As an example, a path of a user trace may be determined using the Viterbi algorithm (e.g., most likely path through a graph) based on one or more of motion probabilities from dead reckoning, transition probabilities from floorplan, or emission probabilities from a WiFi model. The non-linear least squares optimizer 704 may receive the output of the global search and align with the dead reckoning to a Viterbi path, as shown at block 718, and jointly optimize all paths and elevation maps using a SLAM or GraphSLAM optimization, as shown at block 720.

The GraphSLAM optimization is performed iteratively on growing subsets of states and constraints to determine a location of a user when data was collected based on all data collected. A first iteration uses subsets so that a function minimized is convex. Running GraphSLAM on these subsets gives an estimate of the state subset. This estimate is used for determining the next subsets to include and the initialization to use for the next iteration. Thus, more constraints are added using a previous determination as a time starting point as the best prediction. The system 700 defines a process that selects states, optimizes the states using a non-linear least squares solver, and runs GraphSLAM algorithms to determine how to initialize the state for the next optimization iteration. Although examples are described as determining an elevation map, similar or same functions may be performed to determine localization of passively collected traces for creation of other types of maps, such as WiFi signal strength or magnetometer maps.

Generally, the Viterbi algorithm may be used to process sensor data to determine estimations of movement of the device by determining a most likely set of possible locations over time for the device based on the collected sensor measurements. In some examples, the Viterbi algorithm may be used to divide a physical space into a graph of locations with edges indicating possible movement between locations. For example, a building may be defined as having nodes for each room, corridor, and floor in the building, and edges indicate possible pathways to move through the building based on locations of doors, stairwells, and elevators. The Viterbi algorithm computes a most likely path through the graph based on collected sensor measurements. In a specific example, a building may include two businesses, and as the computing device moves through the building, sensor measurements from barometers may appear similar in location and can be difficult to distinguish as to an exact location to determine which business the computing device is in. At a later time, movement up stairs can be detected by a barometer or an accelerometer signal in the computing device. Based on reference to a floor plan, it may be determined that only one of the businesses has stairs, and from this new information, the Viterbi algorithm adjusts a likelihood of the two formerly ambiguous locations to identify one where the computing device entered a business with the stairs as more likely. A set of most likely possible location histories can be maintained and updated each time new information is provided.

Further, generally the non-linear least-squares solver can be used to perform smoothing and mapping to estimate movement of the device. An initial hypothesis of locations of the computing device can be determined (e.g., which may include locations along a projected trajectory of the computing device), such as based on GPS and barometer data. The initial hypothesis can be iteratively adjusted based on models of motion and sensor characteristics using gradient descent. A location at all points in history can be determined (covering a specified time) that have a lowest error compared to a model for each sensor and an external database of information. In some examples, the non-linear least-squares solver may be used to estimate location positions in continuous space. All sensor measurements may be input and a location at all points in history can be determined that have a lowest error compared to a model for each sensor and an external database of information, such as a surface of good GPS visibility. A full trajectory can be estimated jointly and uncertainties and noise inherent in sensor measurements may be taken into account, although discounted by the applied weights. Initially, a guess of a trajectory is used (e.g., such as from GPS or best guess of position for each barometer reading), and the initial guess is iteratively adjusted by moving each location guess in the history in a direction that better fits all of the models of motion and sensor characteristics using gradient descent. Eventually, positions are moved to a local minima where a location history may not be adjusted any more without making an estimate worse. A final result is an estimate for the location history taking into account measurements from the entire history.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

It should also be understood that for situations in which the embodiments discussed herein collect and/or use any personal information about users or information that might relate to personal information of users, the users may be provided with an opportunity to opt in/out of programs or features that involve such personal information (e.g., information about a user location). In addition, certain data may be anonymized in one or more ways before it is stored or used, so that personally identifiable information is removed. For example, a user's location may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system comprising:
a device comprising a barometer; and
a computing device comprising:
 one or more processors; and
 data storage configured to store instructions that, when executed by the one or more processors, cause the computing device to perform functions comprising:
  receiving logs of data, wherein respective data in the received logs of data are collected by one or more sensors of the device over one or more locations in a three-dimensional area and over a time period; and
  performing a simultaneous localization and mapping (SLAM) optimization, wherein performing the SLAM optimization comprises:
   determining a series of horizontal locations of the device using GPS positioning data available in the received logs of data as a constraint, wherein each of the horizontal locations comprises a latitudinal value and a longitudinal value;
   determining a corresponding series of elevation locations of the device using GPS elevation data available in the received logs of data as an absolute elevation constraint and barometer data available in the received logs of data as a relative elevation constraint; and
   generating a map of the three-dimensional area and a path that the device traversed through the three-dimensional area over the time period, wherein the path of the device comprises the series of horizontal locations of the device and the corresponding series of elevation locations of the device, wherein the map of the three-dimensional area and the path of the device are generated simultaneously, and wherein the device is configured to calibrate the barometer based on the map of the three-dimensional area or the path of the device.

2. The system of claim 1,
wherein the functions further comprise selecting, for use in the SLAM optimization, logs of data from the received logs of data, and
wherein the selected logs of data include barometer data associated with GPS elevation data.

3. The system of claim 2, wherein performing the SLAM optimization further comprises horizontally localizing the selected logs of data.

4. The system of claim 3, wherein horizontally localizing the selected logs of data comprises using the GPS elevation data as a constraint.

5. The system of claim 1,
wherein the functions further comprise defining a surface of GPS visibility greater than a predetermined visibility threshold,
wherein the surface of GPS visibility greater than the predetermined visibility threshold corresponds to a ground level surface, and
wherein determining the corresponding series of elevation locations of the device comprises determining the corresponding series of elevation locations of the device using the surface of GPS visibility greater than the predetermined visibility threshold as a constraint.

6. The system of claim 4,
wherein performing the SLAM optimization further comprises using a smoothing constraint,
wherein the smoothing constraint limits an elevation change between adjacent horizontal locations in the selected logs of data, and
wherein the smoothing constraint specifies that elevation locations at adjacent horizontal locations are similar.

7. The system of claim 1,
wherein the map of the three-dimensional area is a first map, the path of the device is a first path, the GPS positioning data is first GPS positioning data available in the received logs of data, the barometer data is first barometer data available in the received logs of data, the GPS elevation data is first GPS elevation data available in the received logs of data, the series of horizontal locations is a first series of horizontal locations of the device, the corresponding series of elevation locations is a first corresponding series of elevation locations of the device, and the SLAM optimization is a first SLAM optimization, and
wherein the functions further comprise performing a second SLAM optimization, wherein performing the second SLAM optimization comprises:
determining a second series of horizontal locations of the device using second GPS positioning data available in the received logs of data as a constraint, wherein each of the horizontal locations in the second series of horizontal locations of the device comprises a latitudinal value and a longitudinal value;
determining a second corresponding series of elevation locations of the device using second GPS elevation data available in the received logs of data as an absolute elevation constraint and second barometer data available in the received logs of data as a relative elevation constraint; and generating a second map of the three-dimensional area and a second path of the device,
wherein the second path of the device comprises the second series of horizontal locations of the device and the second corresponding series of elevation locations of the device,
wherein the second map of the three-dimensional area and the second path of the device are generated simultaneously, and
wherein the device is configured to calibrate the barometer based on the second map of the three-dimensional area or the second path of the device.

8. A method comprising:
receiving logs of data, wherein respective data in the received logs of data are collected by one or more sensors of a device, including a barometer of the device, over one or more locations in a three-dimensional area and over a time period;
performing a simultaneous localization and mapping (SLAM) optimization, wherein performing the SLAM optimization comprises:
determining a series of horizontal locations of the device using GPS positioning data available in the received logs of data as a constraint, wherein each of the horizontal locations comprises a latitudinal value and a longitudinal value;
determining a corresponding series of elevation locations of the device using GPS elevation data available in the received logs of data as an absolute elevation constraint and barometer data available in the received logs of data as a relative elevation constraint; and
generating a map of the three-dimensional area and a path that the device traversed through the three-dimensional area over the time period, wherein the path of the device comprises the series of horizontal locations of the device and the corresponding series of elevation locations of the device, and
wherein the map of the three-dimensional area and the path of the device are generated simultaneously; and
recalibrating the barometer of the device based on the map of the three-dimensional area or the path of the device.

9. The method of claim 8, further comprising selecting, for use in the SLAM optimization, logs of data from the received logs of data, wherein the selected logs of data include barometer data associated with GPS elevation data.

10. The method of claim 9, wherein performing the SLAM optimization further comprises horizontally localizing the selected logs of data.

11. The method of claim 10, wherein horizontally localizing the selected logs of data comprises using the GPS elevation data as a constraint.

12. The method of claim 8, further comprising defining a surface of GPS visibility greater than a predetermined visibility threshold,
wherein the surface of GPS visibility greater than the predetermined visibility threshold corresponds to a ground level surface, and
wherein determining the corresponding series of elevation locations of the device comprises determining the corresponding elevation locations of the device using the surface of GPS visibility greater than the predetermined visibility threshold as a constraint.

13. The method of claim 11,
wherein performing the SLAM optimization further comprises using a smoothing constraint, wherein the smoothing constraint limits an elevation change between adjacent horizontal locations in the selected logs of data, and wherein the smoothing constraint specifies that elevation location values at adjacent horizontal locations are similar.

14. The method of claim 8, wherein the map of the three-dimensional area is a first map, the path of the device is a first path, the GPS positioning data is first GPS positioning data available in the received logs of data, the barometer data is first barometer data available in the received logs of data, the GPS elevation data is first GPS elevation data available in the received logs of data, the series of horizontal locations is a first series of horizontal locations of the device, the corresponding series of elevation locations is a first corresponding series of elevation locations of the device, and the SLAM optimization is a first SLAM optimization, and wherein the method further comprises performing a second SLAM optimization, wherein performing the second SLAM optimization comprises:

determining a second series of horizontal locations of the device using second GPS positioning data available in the received logs of data as a constraint, wherein each of the horizontal locations in the second series of horizontal locations of the device comprises a latitudinal value and a longitudinal value;

determining a second corresponding series of elevation locations of the device using second GPS elevation data available in the received logs of data as an absolute elevation constraint and second barometer data available in the received logs of data as a relative elevation constraint; and generating a second map of the three-dimensional area and a second path of the device, wherein the second path of the device comprises the second series of horizontal locations of the device and the second corresponding series of elevation locations of the device, wherein the second map of the three-dimensional area and the second path of the device are generated simultaneously, and wherein the device is configured to calibrate the barometer based on the second map of the three-dimensional area or the second path of the device.

15. A non-transitory computer-readable medium having stored therein instructions that, when executed by one or more processors, cause the one or more processors to perform functions comprising:

receiving logs of data, wherein respective data in the received logs of data are collected by one or more sensors of a device, including a barometer of the device, over one or more locations in a three-dimensional area and over a time period; and performing a simultaneous localization and mapping (SLAM) optimization, wherein performing the SLAM optimization comprises:

determining a series of horizontal locations of the device using GPS positioning data available in the received logs of data as a constraint, wherein each of the horizontal locations comprises a latitudinal value and a longitudinal value;

determining a corresponding series of elevation locations of the device using GPS elevation data available in the received logs of data as an absolute elevation constraint and barometer data available in the received logs of data as a relative elevation constraint; and generating a map of the three-dimensional area and a path that the device traversed through the three-dimensional area over the time period, wherein the path of the device comprises the series of horizontal locations of the device and the corresponding series of elevation locations of the device, wherein the map of the three-dimensional area and the path of the device are generated simultaneously, and wherein the device is configured to calibrate the barometer based on the map of the three-dimensional area or the path of the device.

16. The non-transitory computer-readable medium of claim 15, wherein the functions further comprise selecting, for use in the SLAM optimization, logs of data from the received logs of data, and wherein the selected logs of data include barometer data associated with GPS elevation data.

17. The non-transitory computer-readable medium of claim 16, wherein performing the SLAM optimization comprises horizontally localizing the selected logs of data.

18. The non-transitory computer-readable medium of claim 17, wherein horizontally localizing the selected logs of data comprises using the GPS elevation data as a constraint.

19. The non-transitory computer-readable medium of claim 15, wherein the functions further comprise defining a surface of GPS visibility greater than a predetermined visibility threshold, wherein the surface of GPS visibility greater than the predetermined visibility threshold corresponds to a ground level surface, and wherein determining the corresponding series of elevation locations of the device comprises determining the corresponding series of elevation locations of the device using the surface of GPS visibility greater than the predetermined visibility threshold as a constraint.

20. The non-transitory computer-readable medium of claim 18, wherein performing the SLAM optimization further comprises using a smoothing constraint, wherein the smoothing constraint limits an elevation change between adjacent horizontal locations in the selected logs of data, and wherein the smoothing constraint specifies that elevation location values at adjacent horizontal locations are similar.

* * * * *